US008902997B2

(12) United States Patent
Kamamoto et al.

(10) Patent No.: US 8,902,997 B2
(45) Date of Patent: Dec. 2, 2014

(54) PARCOR COEFFICIENT QUANTIZATION METHOD, PARCOR COEFFICIENT QUANTIZATION APPARATUS, PROGRAM AND RECORDING MEDIUM

(75) Inventors: Yutaka Kamamoto, Kanagawa (JP); Noboru Harada, Kanagawa (JP); Takehiro Moriya, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 400 days.

(21) Appl. No.: 13/320,861

(22) PCT Filed: Jun. 1, 2010

(86) PCT No.: PCT/JP2010/059271
§ 371 (c)(1),
(2), (4) Date: Dec. 2, 2011

(87) PCT Pub. No.: WO2010/140590
PCT Pub. Date: Dec. 9, 2010

(65) Prior Publication Data

US 2012/0072226 A1 Mar. 22, 2012

(30) Foreign Application Priority Data

Jun. 3, 2009 (JP) ................................ 2009-134370

(51) Int. Cl.
*H04B 14/04* (2006.01)
*G10L 19/06* (2013.01)
*G10L 19/00* (2013.01)

(52) U.S. Cl.
CPC ............. *G10L 19/06* (2013.01); *G10L 19/0017* (2013.01)
USPC ............................ 375/243; 375/245; 375/253

(58) Field of Classification Search
USPC .......................................... 375/243, 245, 253
See application file for complete search history.

(56) References Cited

U.S. PATENT DOCUMENTS 4,538,234 A * 8/1985 Honda et al. .................. 704/229
2010/0004934 A1 1/2010 Hirose et al.

FOREIGN PATENT DOCUMENTS

| | | |
|---|---|---|
| JP | 56-28276 | 6/1981 |
| JP | 61-95400 | 5/1986 |
| JP | 2008-185701 | 8/2008 |
| JP | 2008-209637 | 9/2008 |
| JP | 2009-069309 | 4/2009 |
| WO | WO 2009/022454 A1 | 2/2009 |

OTHER PUBLICATIONS

Office Action issued on Oct. 1, 2013 in Japanese Patent Application No. 2011-518455 (with English language translation).

(Continued)

*Primary Examiner* — Kabir A Timory
(74) *Attorney, Agent, or Firm* — Oblon, Spivak, McClelland, Maier & Neustadt, L.L.P.

(57) ABSTRACT

On a criterion to minimize the entropy of the linear prediction residual of the input signal used for calculation of the input PARCOR coefficient sequence, PARCOR coefficients with larger absolute values are quantized with higher quantization precisions so as to reduce the increase of the code amount of the linear prediction residual caused by the quantization error of the PARCOR coefficients. If the PARCOR coefficient is represented by a value formed by a predetermined number of bits, the number of effective bits from the most significant bit toward the least significant bit included in the output value increases with the absolute value of the PARCOR coefficient.

3 Claims, 9 Drawing Sheets

(56) References Cited

OTHER PUBLICATIONS

Chinese Office Action issued Oct. 30, 2012 in Patent Application No. 201080022910.X with English Translation.
Hirokazu Kameoka, et al., "A Linear Predictive Coding Algorithm Minimizing the Golomb-Rice Code Length of the Residual Signal", The Transactions of the Institute of Electronics, Information and Communication Engineers, vol. J91-A, No. 11, Nov. 2008, pp. 1017-1025 (with partial English translation).
Nobuhiko Kitawaki, et al., "Optimum Coding of Transmission Parameters in PARCOR Speech Analysis Syntheses System", The Transactions of the Institute of Electronics and Communication Engineers of Japan, vol. J61-A, No. 2, Feb. 1978, pp. 119-126 (with partial English translation).
Yoh'ichi Tohkura, et al., "Improvement of Voice Quality in PARCOR Bandwidth Compression System", The Transactions of the Institute of Electronics and Communication Engineers of Japan, vol. J61-A, No. 3, Mar. 1978, pp. 254-261 (with partial English translation).
Nobuhiko Kitawaki, et al., "Efficient Coding of Speech by Nonlinear Quantization and Nonuniform Sampling of PARCOR Coefficients", The Transactions of the Institute of Electronics and Communication Engineers of Japan, vol. J61-A, No. 6, Jun. 1978, pp. 543-550 (with partial English translation).
Tilman Liebchen, et al., "The MPEG-4 Audio Lossless Coding (ALS) Standard—Technology and Applications" AES 119$^{th}$ Convention, Oct. 2005, pp. 1-14.
Japanese Office Action issued May 27, 2014 in Patent Application No. 2011-518455 with English Translation.

* cited by examiner

LOOK-UP TABLE

PARCOR COEFFICIENT QUANTIZATION METHOD, PARCOR COEFFICIENT QUANTIZATION APPARATUS, PROGRAM AND RECORDING MEDIUM

TECHNICAL FIELD

The present invention relates to a lossless coding technique for a digital time sequence signal, such as an audio signal.

BACKGROUND ART

For example, consider a situation where an input signal is processed on a frame basis, and each frame contains N samples, as shown in FIG. 1. The input signal is represented as XO(n) (n=1, 2, . . . , N). The maximum allowable order of the PARCOR coefficient is Pmax.

A linear prediction analysis part 901 calculates the PARCOR coefficients of the first order to the predetermined maximum, Pmax-th order, KO(1), KO(2), . . . , KO(Pmax) from the input signal XO(n) according to the Levinson-Durbin method, the Burg method or the like, and outputs an optimal order PO and a PARCOR coefficient sequence KO=(KO(1), KO(2), . . . , KO(PO)) of the PARCOR coefficients of the first order to the PO-th order determined according to some method (see Patent literature 1, for example).

A quantization part 903 quantizes the PARCOR coefficient sequence KO and outputs a quantized PARCOR coefficient sequence K'O=(K'O(1), K'O(2), . . . , K'O(PO)). A reverse conversion part 905 converts the quantized PARCOR coefficient sequence K'O into a linear prediction coefficient sequence a'O=(a'O(1), a'O(2), . . . , a'O(PO)), and outputs the linear prediction coefficient sequence a'O=(a'O(1), a'O(2), . . . , a'O(PO)). A filter 907 performs PO-th order filtering of the input signal XO(n) (n=1, 2, . . . , N) using the linear prediction coefficient sequence a'O=(a'O(1), a'O(2), . . . , a'O(PO)) as a filter factor according to the following formula (1), thereby determining a prediction residual eO(n) (n=1, 2, . . . , N). Note that aO'(0)=1. In the following formula, the symbol "x" represents a multiplication.

$$eo(n) = \sum_{i=0}^{Po} a'o(i) \times Xo(n-i) \tag{1}$$

A residual coding part 911 performs entropy coding of the prediction residual eO(n), for example, and outputs a residual code CeO. A coefficient coding part 909 codes the optimal order PO and the quantized PARCOR coefficient sequence K'O=(K'O(1), K'(2), . . . , K'O(PO)) and outputs a coefficient code CkO. A code synthesis part 913 combines the residual code CeO and the coefficient code CkO and outputs the resulting synthesis code CaO.

The quantization part 903 quantizes the PARCOR coefficient for efficient code transmission.

FIG. 2 shows an example of linear quantization of the PARCOR coefficient according to a prior art. Each PARCOR coefficient in the PARCOR coefficient sequence KO assumes a real number value falling within a range from −1 to +1. Assuming that each PARCOR coefficient is calculated with a 16-bit precision, and the value obtained by multiplying the PARCOR coefficient by 32768 is represented by a signed 16-bit integer, the PARCOR coefficient can assume a value falling within a range from −32768 to +32767. That is, −(32768/32768) =−1 corresponds to a signed 16-bit integer that represents −32768, and +−(32767/32768) ≈+1 corresponds to a signed 16-bit integer that represents +32767. The signed 16-bit integer values are linearly quantized with four bits. Specifically, of the bits of the signed 16-bit integers that represent the values obtained by multiplying the PARCOR coefficients in the PARCOR coefficient sequence KO by 32768, the higher order four bits are maintained, and the remaining lower order twelve bits are padded with 0. Then, the resulting value is divided by 32768, resulting in a quantized PARCOR coefficient sequence K'O. The quantized PARCOR coefficients in the quantized PARCOR coefficient sequence K'O are 4-bit precision values, and therefore, the error due to the quantization is significant compared with the 16-bit precision. However, the code amount required to represent each quantized PARCOR coefficient in the quantized PARCOR coefficient sequence K'O is only 4 bits. The quantization precision can be determined based on the trade-off between the quantization error and the code amount.

According to a conventional audio coding involving some loss (distortion), in order to prevent an audible sound quality degradation in the case where the PARCOR coefficient is coded with a small code amount, the PARCOR coefficient is quantized by using the spectral distortion as a measure. As disclosed in Non-patent literatures 1 to 3, nonlinear quantization is performed by using an arc sin function or a tan h function, and the bit allocation is varied depending on the order. As an alternative, as disclosed in Non-patent literature 4, in lossless coding of an audio signal according to MPEG-4 ALS, a nonlinear function involving a radical sign is used. In any case, to prevent the prediction residual eO(n) from increasing, the PARCOR coefficient sequence KO is quantized by quantizing PARCOR coefficients close to −1 and +1 that have higher sensitivities (more significant errors) with higher precisions and quantizing PARCOR coefficients close to 0 with lower precisions. However, the nonlinear quantization requires a more complicated process than the linear quantization.

PRIOR ART LITERATURE

Patent Literature

Patent literature 1: Japanese Patent Application Laid-Open No. 2009-69309

Non-Patent Literature

Non-patent literature 1: Kitawaki, Itakura and Saito, "Optimum Coding of Transmission Parameters in PARCOR Speech Analysis Synthesis System", The Transactions of the Institute of Electronics and Communication Engineers of Japan, Vol. J61-A, No. 2, pp. 119-126

Non-patent literature 2: Tohkura and Itakura, "Improvement of Voice Quality in PARCOR Bandwidth Compression System", The Transactions of the Institute of Electronics and Communication Engineers of Japan, Vol. J61-A, No. 3, pp. 254-261

Non-patent literature 3: Kitawaki and Itakura, "Efficient Coding of Speech by Nonlinear Quantization and Nonuniform Sampling of PARCOR Coefficients", The Transactions of the Institute of Electronics and Communication Engineers of Japan, Vol. J61-A, No. 6, pp. 543-550

Non-patent literature 4: T. Liebchen, et. al., "The MPEG-4 Audio Lossless Coding (ALS) Standard—Technology and Applications," AES 119th Convention, New York, USA, October, 2005

SUMMARY OF THE INVENTION

Problem to be Solved by the Invention

According to quantization methods for PARCOR coefficients used in conventional lossy audio coding (see Non-patent literatures 1 to 3), the quantizer is designed on a criterion to minimize an audio distortion. However, even if the audio distortion is minimized, the entropy of the linear prediction residual of the input signal is not minimized, and the code amount is not minimized. Therefore, there is a problem that the code amount in lossless coding is not minimized on this criterion.

In view of such circumstances, an object of the present invention is to provide a PARCOR coefficient quantization technique for high-compression lossless coding.

Means to Solve the Problems

According to the present invention, on a criterion to minimize an entropy of a linear prediction residual of an input signal used for calculation of an input sequence of PARCOR coefficients, a PARCOR coefficient having a larger absolute value is quantized with a higher quantization precision so as to reduce an increase of a code amount of the linear prediction residual caused by a quantization error of the PARCOR coefficient.

For example, assuming that the PARCOR coefficient is represented by an R-bit value, U represents a predetermined integer equal to or greater than 1 and smaller than $\{R-(2^U-1)\}$, and V represents a predetermined integer equal to or greater than 0 and smaller than $\{R-(2^U-1)-U\}$, a bit sequence that represents an absolute value L of the PARCOR coefficient K can be determined, U bits beginning with the most significant bit can be acquired from the bit sequence (the U-bit value is denoted by W), and (U+V+W) bits beginning with the most significant bit can be acquired from the bit sequence.

In summary, on a criterion to minimize entropy, PARCOR coefficients close to −1 and +1 that have higher sensitivities are quantized with higher precisions, and PARCOR coefficients close to 0 are quantized with lower precisions.

Effects of the Invention

According to the present invention, a PARCOR coefficient is quantized on a criterion to minimize entropy, and therefore, the compression ratio of lossless coding can be improved.

DETAILED DESCRIPTION OF THE EMBODIMENTS

Figure 1:
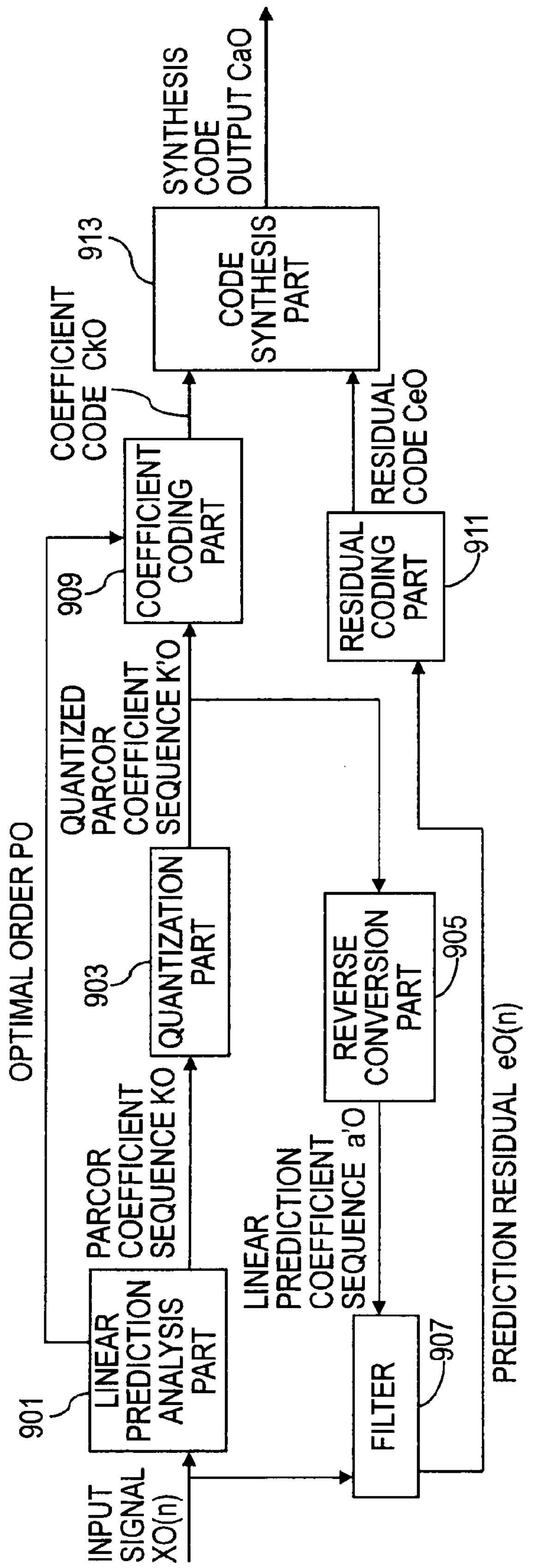
FIG.1 PRIOR ART
FIG. 1 is a diagram showing an exemplary functional configuration for a coding process including a conventional PARCOR coefficient quantization.
Figure 2:
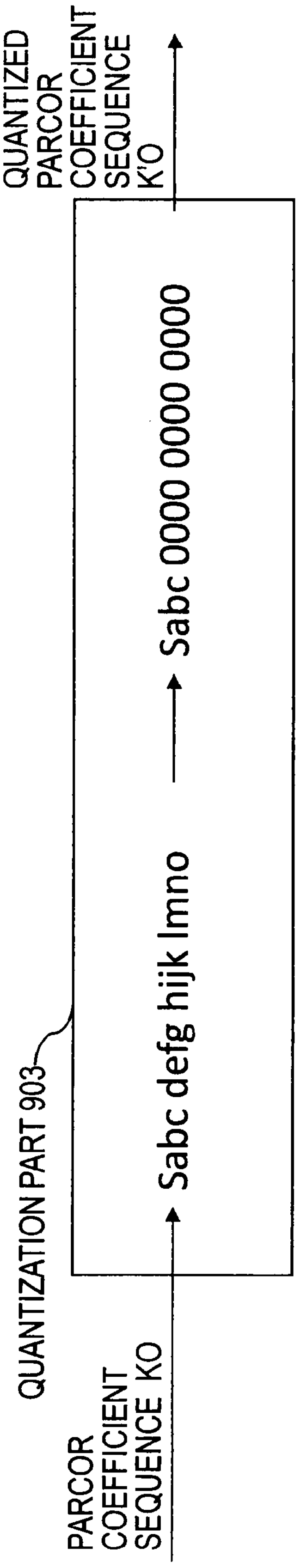
FIG.2 PRIOR ART
FIG. 2 is a diagram showing an example of the conventional PARCOR coefficient quantization.

As disclosed in Japanese Patent Application Laid-Open No. 2009-69309, an energy of a prediction residual can be estimated by using a PARCOR coefficient. An energy EO(0) per frame of input signals XO(n) (n=1, 2, . . . , N) the average of which is 0 (if the average is not 0, the average value (bias) can be previously subtracted from the values of all the samples) is expressed by the following formula (2).

$$Eo(0)=\sum_{n=1}^{N}(Xo(n))^2 \tag{2}$$

An energy EO(1) of a prediction residual of a first-order linear prediction is expressed by the following formula (3) using a PARCOR coefficient KO(1).

$$Eo(1)=Eo(0)\times(1-Ko(1)^2) \tag{3}$$

An energy EO(2) of a prediction residual of a second-order linear prediction is expressed by the following formula (4) using a PARCOR coefficient KO(2).

$$Eo(2)=Eo(1)\times(1-Ko(2)^2) \tag{4}$$

Similar calculations are performed until the Pmax-th order is reached. An energy EO(Pmax) of a prediction residual of a Pmax-th-order linear prediction is expressed by the following formula (5).

$$Eo(P_{max})=Eo(0)\prod_{i=1}^{P_{max}}(1-Ko(i)^2) \tag{5}$$

An entropy of a Gaussian distribution with an average of 0 and a variance of $\sigma^2$ (which is the energy divided by N) is expressed by the following formula (6).

$$H_G(\sigma^2)=\log_2(\sqrt{2\pi e\sigma^2}) \tag{6}$$

An entropy of a Laplace distribution with an average of 0 and a variance of $\sigma^2$ (which is the energy divided by N) is expressed by the following formula (7).

$$H_L(\sigma^2)=\log_2(\sqrt{2e^2\sigma^2}) \tag{7}$$

Both the entropies depend on the variance $\sigma^2$ and expressed by the following formula (8), where β represents a constant.

$$Ho(\sigma^2)=\beta+\frac{1}{2}\log_2(\sigma^2) \tag{8}$$

The value of the constant β is approximately 2 according to the formula (6) in the case of the Gaussian distribution, and is approximately 1.7 according to the formula (7) in the case of the Laplace distribution.

According to the formulas (5) and (8), an entropy HO(PO) of a prediction residual of a linear prediction of the PO-th order, which is the optimal order or, in other words, the estimated average number of bits required for one sample of prediction residual is expressed by the following formula (9).

$$\begin{aligned} Ho(Po) &= \beta + \frac{1}{2}\log_2(Eo(Po)/N) \\ &= \beta + \frac{1}{2}\log_2\left(Eo(0)\prod_{i=1}^{PO}(1-Ko(i)^2)/N\right) \\ &= \beta + \frac{1}{2}\log_2\left((Eo(0)/N)\times\prod_{i=1}^{PO}(1-Ko(i)^2)\right) \\ &= \beta + \frac{1}{2}\log_2(Eo(0)/N) + \frac{1}{2}\log_2\left(\prod_{i=1}^{PO}(1-Ko(i)^2)\right) \\ &= \beta + \frac{1}{2}\log_2(Eo(0)/N) + \frac{1}{2}\sum_{i=1}^{PO}\log_2(1-Ko(i)^2) \end{aligned} \tag{9}$$

The second term of the right side of the formula (9) depends on the input signal and therefore can be regarded as a constant. Therefore, the value of the entropy HO(PO) varies depending on the value of the third term of the right side of the formula (9). In fact, when a white noise for which each PARCOR coefficient of the PARCOR coefficient sequence KO assumes a value close to 0 is input, the third term of the right side of the formula (9) also assumes a value close to 0, so that the entropy cannot be reduced, and therefore, the estimated average number of bits required for one sample of prediction residual cannot be reduced. If KO(1) and KO(2) in the PARCOR coefficient sequence KO assume a value close to +1 or −1 as shown in Non-patent literatures 1 to 4, the third term of the right side of the formula (9) assume a negative value, and the entropy decreases, so that the estimated average number of bits required for one sample of prediction residual can be reduced. For example, as shown in FIG. 4 of Non-patent literature 4, the PARCOR coefficient of the first order assumes a value close to 0.95, so that the part of the third term of the right side of the formula (9) that corresponds to the PARCOR coefficient of the first order can be expressed by the following formula (10), and a residual code CeO can be reduced in size by approximately 1.6 bits.

$$\begin{aligned} \frac{1}{2}\log_2(1-Ko(1)^2) &= \frac{1}{2}\log_2(1-0.95\times 0.95) \\ &= \frac{1}{2}\times(-3.358\ \ldots) \end{aligned} \tag{10}$$

Figure 4:
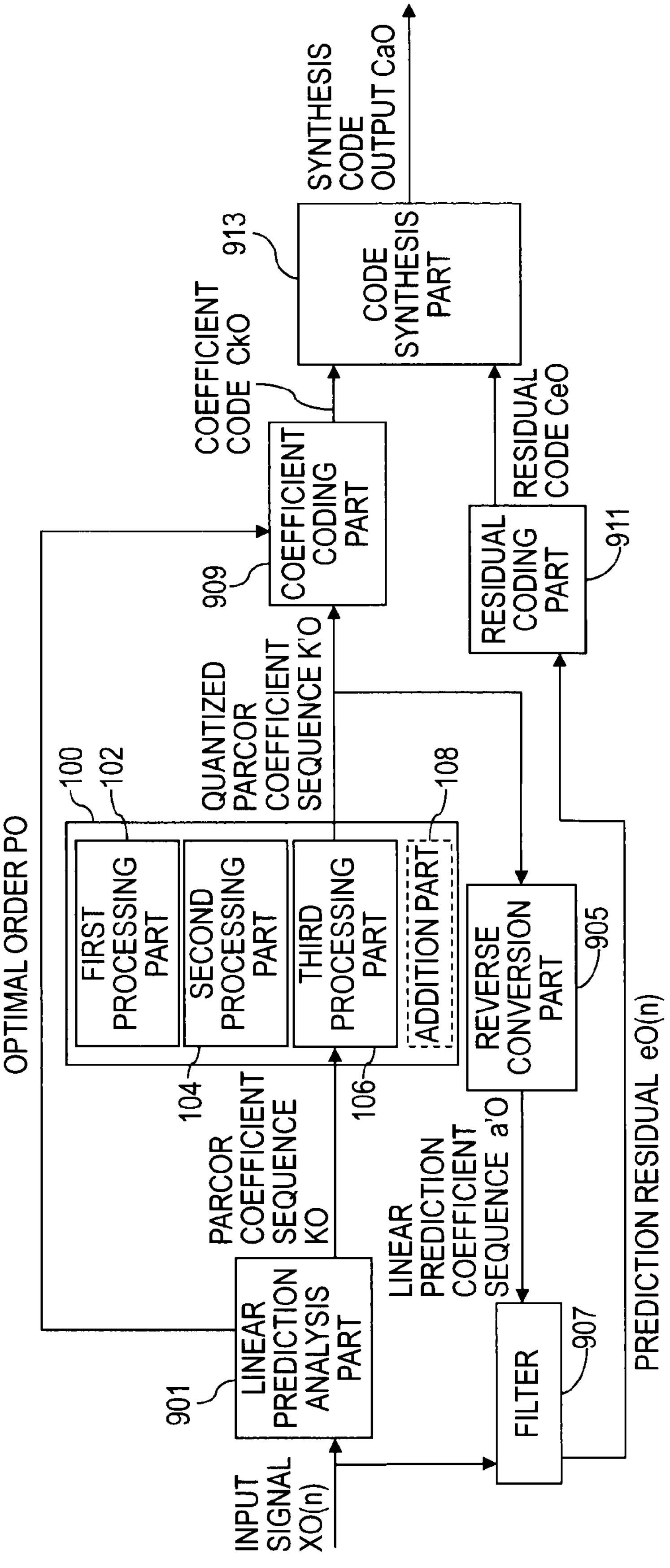
FIG. 4 is a diagram showing an exemplary functional configuration for a coding process including a PARCOR coefficient quantization according to practical examples 1 and 2.
Figure 5:
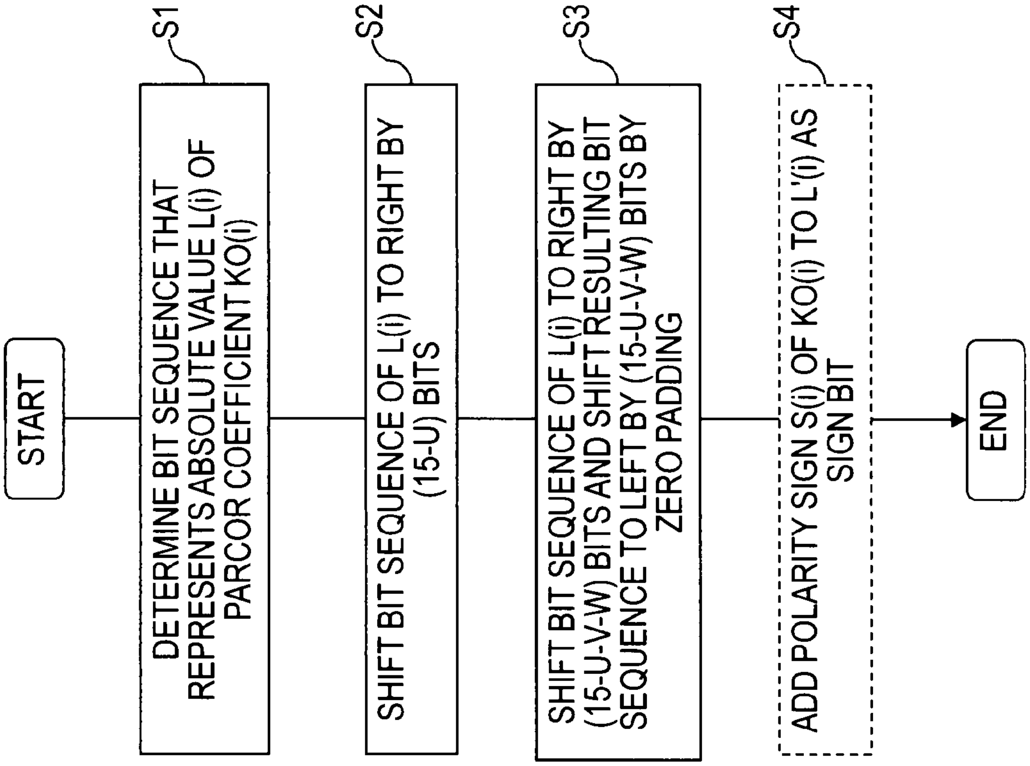
FIG. 5 is a diagram showing a process flow of the PARCOR coefficient quantization according to the practical example 2.
Figure 6:
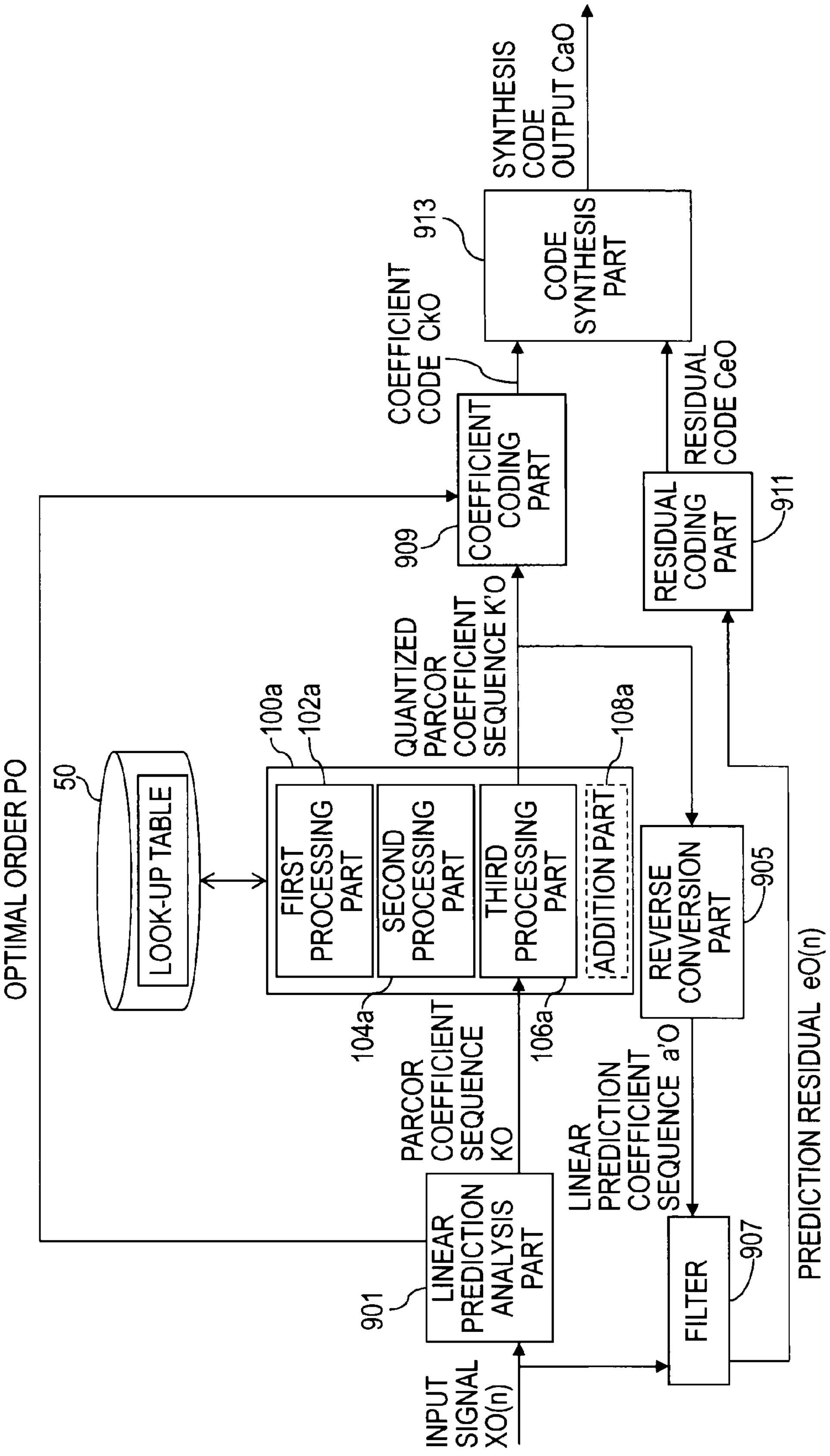
FIG. 6 is a diagram showing an exemplary functional configuration for a coding process including a PARCOR coefficient quantization according to a practical example 3.

On the other hand, as shown in FIG. 4 of Non-patent literature 4, the PARCOR coefficient of the fourth order assumes a value close to 0.25, so that the part of the third term of the right side of the formula (9) that corresponds to the PARCOR coefficient of the fourth order can be expressed by the following formula (11), and the residual code CeO can be reduced in size only by approximately 0.05 bits.

$$\begin{aligned} \frac{1}{2}\log_2(1-Ko(4)^2) &= \frac{1}{2}\log_2(1-0.25\times 0.25) \\ &= \frac{1}{2}\times(-0.093\ \ldots) \end{aligned} \tag{11}$$

In the case of lossless coding, the optimal order PO and a coefficient code CkO resulting from coding of a quantized PARCOR coefficient sequence K'O are also transmitted. Therefore, assuming that the number of bits of a coefficient code corresponding to the optimal order PO is represented as γ (in the case where the optimal order PO is coded with a fixed number of bits, γ is a constant and therefore is negligible in calculation), and the code amounts of coefficient codes corresponding to quantized PARCOR coefficients K'O(1), K'O(2), . . . , K'O(PO) are represented as C(1), C(2), . . . , C(PO), an estimated code amount of a synthesis code CaO in the case where one frame contains N samples can be expressed by the following formula (12).

$$\begin{aligned} Bo(Po) &= Ho(Po)\times N + \sum_{i=1}^{PO} C(i) + \gamma \\ &= \left\{\beta + \frac{1}{2}\log_2(Eo(0)/N) + \frac{1}{2}\sum_{i=1}^{PO}\log_2(1-K'o(i)^2)\right\}\times N + \sum_{i=1}^{PO} C(i) + \gamma \end{aligned} \tag{12}$$

Figure 3:
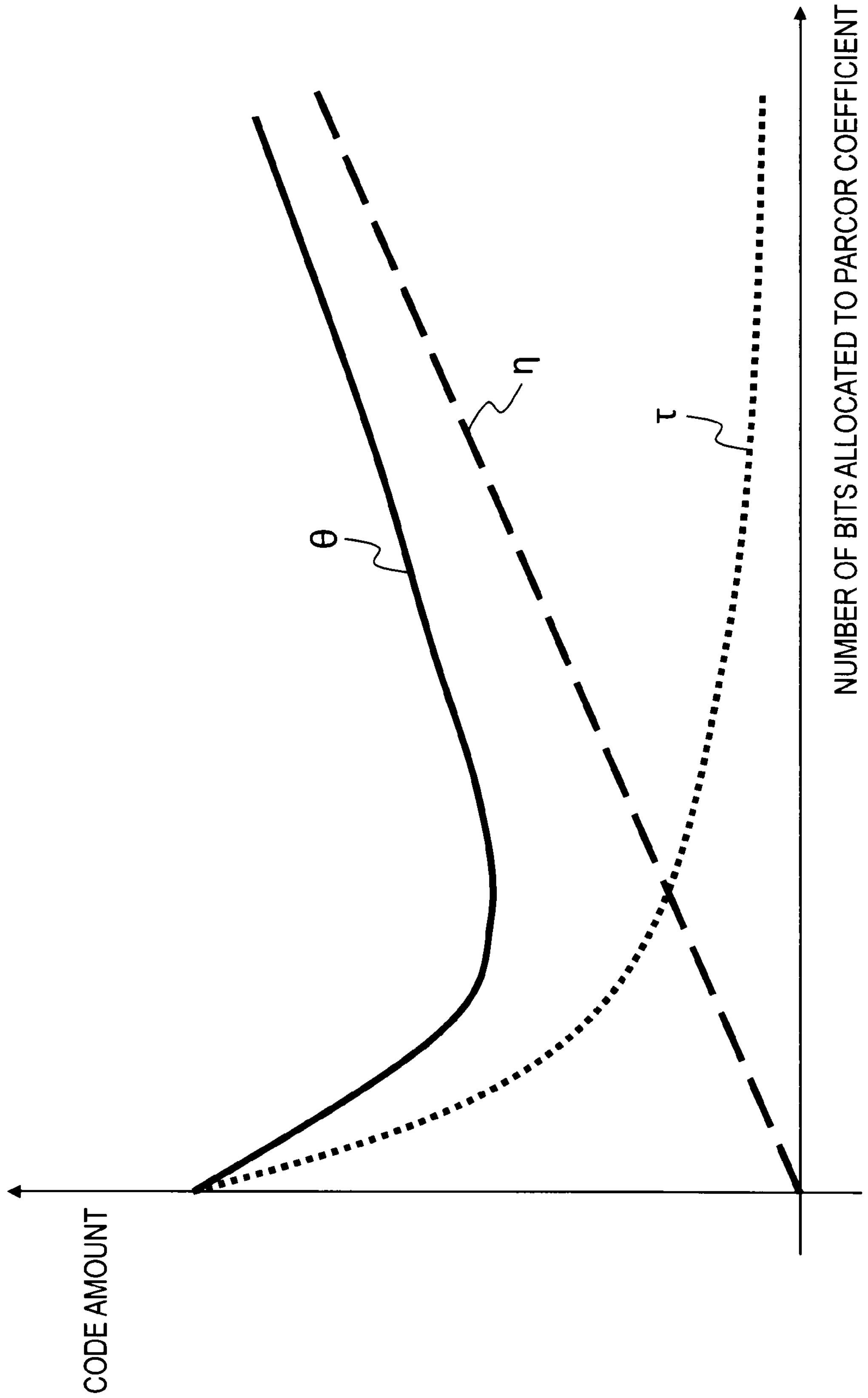
FIG. 3 is a graph showing a relationship between the number of bits allocated to a PARCOR coefficient and the code amount of a linear prediction residual.

Referring to FIG. 3, the solid line θ represents the code amount of the synthesis code according to the formula (12). As the quantization precision of the PARCOR coefficients becomes higher, the difference between the PARCOR coefficient sequence KO and the quantized PARCOR coefficient sequence K'O decreases, so that the prediction residual eO(n) decreases, and therefore, the code amount required to represent the residual code shown by the dotted line τ in FIG. 3 decreases. However, the code amount required to represent the quantized PARCOR coefficient sequence K'O shown by the dashed line η in FIG. 3 increases. Thus, the estimated code amount of the synthesis code CaO does not always decrease as the precision of the PARCOR coefficients becomes higher.

In view of such circumstances, the present invention performs quantization of a PARCOR coefficient based on the fact that the increase of the code amount of the residual code CeO caused by an quantization error of the PARCOR coefficient is significant when the value of the PARCOR coefficient is large, and the increase of the code amount of the residual code CeO caused by the quantization error of the PARCOR coefficient is less significant when the value of the PARCOR coefficient is small.

That is, according to the present invention, on a criterion to minimize the entropy of a linear prediction residual of an input signal used for calculation of an input PARCOR coefficient sequence, a PARCOR coefficient having a larger absolute value is quantized with a higher quantization precision so as to reduce the increase of the code amount of the linear prediction residual caused by the quantization error of the PARCOR coefficient.

[Embodiment]

An embodiment of the present invention involves a quantization part 100 having a functional configuration shown in FIG. 4. A functional configuration for a coding process according to this embodiment is generally the same as the functional configuration shown in FIG. 1 except that the quantization part 903 is replaced with the quantization part 100. When a PARCOR coefficient sequence KO=(KO(1), KO(2), . . . , KO(PO)), each PARCOR coefficient of which is determined with 16 bits with sign, is input to the quantization part 100, the quantization part 100 quantizes each PARCOR coefficient KO(i) (i=1, 2, . . . , PO), and outputs a quantized PARCOR coefficient sequence K'O=(K'O(1), K'O(2), . . . , K'O(PO)). The quantized PARCOR coefficient sequence K'O=(K'O(1), K'O(2), . . . , K'O(PO)) is passed to a coefficient coding part 909.

PRACTICAL EXAMPLE 1

The number of effective bits (1 in the binary notation) from the most significant bit toward the least significant bit included in the value output from the quantization part 100 increases with the absolute value of the input PARCOR coefficient.

SPECIFIC EXAMPLE 1

It is assumed that $P_1=3$, $P_2=2$, and R=16, and the PARCOR coefficient KO(i) is represented by R bits without sign in the binary notation (the leftmost bit is the most significant bit). Specifically, it is assumed that the bit sequence of the PARCOR coefficient KO(i) is a 16-bit sequence abcd efgh ijkl mnop. Then, if the most significant one bit ("a") located leftmost is 1, the quantization part 100 passes the highest order $P_1$ bits ("1bc") to a coefficient coding part 909 as a coding target. If the most significant one bit ("a") is 0, the quantization part 100 passes the highest order $P_2$ bits ("0b") to the coefficient coding part 909 as a coding target. In short, if the most significant one bit is 1, the quantized PARCOR coefficient is a 16-bit value 1xxy yyyy yyyy yyyy, and if the most significant one bit is 0, the quantized PARCOR coefficient is a 16-bit value 0xyy yyyy yyyy yyyy. Note that the value at the bit position x is the value of the bit at the corresponding position in the bit sequence representing the original PARCOR coefficient KO(i), and the value at the bit position y is a predetermined arbitrary value (0, for example).

In summary, whether the absolute value of the PARCOR coefficient KO(i) falls within a larger range or a smaller range is determined based only on the most significant bit of the R bits without sign representing the PARCOR coefficient KO(i) or, in other words, the most significant bit of the part of the PARCOR coefficient KO(i) that represents the absolute value. And if the absolute value of the PARCOR coefficient KO(i) falls within the larger range, the $P_1$ bits beginning with the most significant bit are the coding target, and if the absolute value of the PARCOR coefficient KO(i) falls within the smaller range, the $P_2$ bits beginning with the most significant bits ($P_1>P_2$) are the coding target.

As shown by the formulas (10) and (11), the entropy reduction effect is expressed by a logarithmic function with base 2. Therefore, the sensitivity of the PARCOR coefficient is on the order of an exponential function of 2, which is the inverse function of the logarithmic function. Therefore, in the binary notation, a quantization based on the most significant bit is a quantization on the criterion to minimize entropy.

SPECIFIC EXAMPLE 2

It is assumed that $P_1=3$, $P_2=2$, and R=16, and the PARCOR coefficient KO(i) is represented by R bits with sign in the binary notation (the leftmost bit is the most significant bit, and a negative number is represented by two's complement). Specifically, it is assumed that the bit sequence of the PARCOR coefficient KO(i) is a 16-bit sequence Sabc defg hijk lmno, where the most significant one bit located leftmost ("S") represents a sign that indicates whether the value of the PARCOR coefficient is positive or negative. Then, if the bit next to the most significant bit (that is, the second leftmost bit "a") is 1, the quantization part 100 passes the $(P_1+1)$ bits ("S1bc") including the $(P_1-1)$ bits to the right of the bit (that is, the third leftmost bit "b" and the fourth leftmost bit "c") to the coefficient coding part 909 as a coding target. If the bit next to the most significant bit ("S") (that is, the second leftmost bit "a") is 0, the quantization part 100 passes the $(P_2+1)$ bits ("S0b") including one bit to the right of the bit (that is, the third leftmost bit "b") to the coefficient coding part 909 as a coding target. In short, if the bit next to the most significant bit is 1, the quantized PARCOR coefficient is a 16-bit value S1xx yyyy yyyy yyyy, and if the bit next to the most significant bit is 0, the quantized PARCOR coefficient is a 16-bit value S0xy yyyy yyyy yyyy. Note that "S" represents a bit that represents a sign, the value at the bit position x is the value of the bit at the corresponding position in the bit sequence representing the original PARCOR coefficient KO(i), and the value at the bit position y is a predetermined arbitrary value (0, for example). For a PARCOR coefficient that is a negative value, the above description of the quantization part 100 holds except that the values, namely 0 and 1, of the bit next to the most significant bit are interchanged since a negative value is represented by two's complement.

The values of $P_1$ and $P_2$ logically satisfy the relationships $P_1<R$, $P_2<R$, and $P_2<P_1$. Specific values of $P_1$ and $P_2$ can be appropriately determined.

In summary, whether the absolute value of the PARCOR coefficient KO(i) falls within a larger range or a smaller range is determined based only on the bit next to the most significant bit of the R bits with sign representing the PARCOR coefficient KO(i) or, in other words, the most significant bit of the part of the PARCOR coefficient KO(i) that represents the absolute value. And if the absolute value of the PARCOR coefficient KO(i) falls within the larger range, the $P_1$ bits beginning with the most significant bit are the coding target, and if the absolute value of the PARCOR coefficient KO(i) falls within the smaller range, the $P_2$ bits beginning with the most significant bits ($P_1>P_2$) are the coding target.

SPECIFIC EXAMPLE 3

It is assumed that R=16, and the PARCOR coefficient KO(i) is represented by R bits with sign. Specifically, it is assumed that the bit sequence of the PARCOR coefficient KO(i) is a 16-bit sequence Sabc defg hijk lmno. Then, the quantization part 100 determines the absolute value of the PARCOR coefficient KO(i) and converts the bit sequence into a 15-bit sequence without sign 0abc defg hijk lmno. At the same time, polarity information S (the most significant bit indicating the polarity, positive or negative, for example) is saved in a memory. If the second leftmost bit "a" located next to the most significant bit of the 15-bit sequence without sign 0abc defg hijk lmno is 1, the quantization part 100 also saves the third leftmost bit "b" and the fourth leftmost bit "c" and discards the fifth leftmost and the following bits (01xx yyyy yyyy yyyy). If the second leftmost bit "a" located next to the most significant bit of the 15-bit sequence without sign 0abc defg hijk lmno is 0, the quantization part 100 saves the third leftmost bit "b" and discards the fourth leftmost and the following bits (00xx yyyy yyyy yyyy). Then, the quantization part 100 adds the polarity sign S to the resulting bit sequence as the most significant bit to form a bit sequence S1xx yyyy yyyy yyyy or S0xx yyyy yyyy yyyy and transmits the bit sequence to the coefficient coding part 909. Note that the coding target part of the bit sequence S1xx yyyy yyyy yyyy is the most significant four bits, and the coding target part of the bit sequence S0xx yyyy yyyy yyyy is the most significant three bits. Note that "S" represents a bit that represents a sign, the value at the bit position x is the value of the bit at the corresponding position in the bit sequence representing the original PARCOR coefficient KO(i), and the value at the bit position y is a predetermined arbitrary value (0, for example).

SPECIFIC EXAMPLE 4

It is assumed that R=16, and the PARCOR coefficient KO(i) is represented by R bits with sign. Specifically, it is assumed that the bit sequence of the PARCOR coefficient KO(i) is a 16-bit sequence Sabc defg hijk lmno. Then, the quantization part 100 determines the absolute value of the PARCOR coefficient KO(i) and converts the bit sequence into a 15-bit sequence without sign 0abc defg hijk lmno. At the same time, polarity information S (the most significant bit indicating the polarity, positive or negative, for example) is passed to the coefficient coding part 909 as a coding target. If the second leftmost bit "a" located next to the most significant bit of the 15-bit sequence without sign 0abc defg hijk lmno is 1, the quantization part 100 saves the third leftmost bit "b" and the fourth leftmost bit "c" and discards the fifth leftmost and the following bits (01xx yyyy yyyy yyyy). If the second leftmost bit "a" located next to the most significant bit of the 15-bit sequence without sign 0abc defg hijk lmno is 0, the quantization part 100 saves the third leftmost bit "b" and discards the fourth leftmost and the following bits (00xx yyyy yyyy yyyy). Then, the quantization part 100 transmits the resulting bit sequence 01xx yyyy yyyy yyyy or 00xy yyyy yyyy yyyy to the coefficient coding part 909. Note that the coding target part of the bit sequence 01xx yyyy yyyy yyyy is the three bits "1xx", and the coding target part of the bit sequence 00xy yyyy yyyy yyyy is the two bits "0x". Note that the value at the bit position x is the value of the bit at the corresponding position in the bit sequence representing the original PARCOR coefficient KO(i), and the value at the bit position y is a predetermined arbitrary value.

PRACTICAL EXAMPLE 2

A generalized, practical example of the specific example 3 described above will be described. The practical example 2 can be equally applied to the specific examples 1 and 2.

The quantization part 100 comprises a first processing part 102, a second processing part 104, a third processing part 106, and an addition part 108. In this example, it is assumed that the PARCOR coefficient KO(i) is represented by an R-bit value, U represents a predetermined integer equal to or greater than 1 and smaller than $\{R-(2^U-1)\}$, and V represents a predetermined integer equal to or greater than 0 and smaller than $\{R-(2^U-1)-U\}$. The reason why U and V are defined as described above is because U and V have to satisfy a relationship R-U-V-W 0, because a bit shift calculation of (R-U-V-W) bits is performed as described later, where W satisfies a relationship $0 \le W \le 2^U-1$. However, for example, it may be assumed that U is a predetermined integer equal to or greater than 1 and smaller than R, and V is a predetermined integer equal to or greater than 0 and smaller than R. In this case, if $R-U-V-W<0$, the bits to the right missing in the bit shift calculation can be regarded as 0. The following is a more specific description in which it is assumed that R=16, U=2, and V=1.

First, the first processing part 102 determines a bit sequence that represents the absolute value L(i) of the PARCOR coefficient KO(i) (Step S1). In this step, the first processing part 102 stores, in a memory, information on the polarity sign S(i) represented by a sign bit of the PARCOR coefficient KO(i). For example, in the case where the bit sequence of the PARCOR coefficient KO(i) is a 16-bit sequence Sabc defg hijk lmno (S is a sign bit, and each bit "a" to "o" assumes a value 0 or 1), the determined bit sequence that represents the absolute value L(i) is a 15-bit sequence without sign 0abc defg hijk lmno. The polarity sign S(i)=S is stored in the memory.

Then, the second processing part 104 shifts the bit sequence representing the absolute value L(i) to the right by (15-U) bits (Step S2). The resulting value is denoted as W (in the decimal notation). In the example described above, the bit sequence representing the absolute value L(i) is shifted to the right by 13 bits to produce a value "0ab". The value W is the decimal notation of the value "0ab" in the binary notation.

Then, the third processing part 106 shifts the bit sequence representing the absolute value L(i) to the right by (15-U-V-W) bits, and then shifts the resulting bit sequence to the left by (15-U-V-W) bits by zero padding (Step S3). The resulting bit sequence is denoted as L'(i). In the example described above, the resulting bit sequences L'(i) are as follows.

In the case where ab=11, that is, W=3, the bit sequence L'(i) is 011c def0 0000 0000.

In the case where ab=10, that is, W=2, the bit sequence L'(i) is 010c de00 0000 0000.

In the case where ab=01, that is, W=1, the bit sequence L'(i) is 001c d000 0000 0000.

In the case where ab=00, that is, W=0, the bit sequence L'(i) is 000c 0000 0000 0000.

Then, the addition part 108 adds the polarity sign S(i) of the PARCOR coefficient KO(i) to the bit sequence L'(i) as a sign bit (Step S4). In the example described above, the sign bit S(i)=S is added to the bit sequence L'(i) as the most significant bit (MSB).

In the case where ab=11, that is, W=3, the resulting bit sequence is S11c def0 0000 0000.

In the case where ab=10, that is, W=2, the resulting bit sequence is S10c de00 0000 0000.

In the case where ab=01, that is, W=1, the resulting bit sequence is S01c d000 0000 0000.

In the case where ab=00, that is, W=0, the resulting bit sequence is S00c 0000 0000 0000.

The 16-bit bit sequence obtained in the processing of Step S4 represents the quantized PARCOR coefficient K'O(i).

Note that, in the processing of Step S3, the missing bits do not have to be always padded with 0 but can be padded with any other numerical value (for example, the missing bits can be alternately padded with 0 and 1 to form a sequence 010101 . . . ). In any case, nonlinear quantization can be performed to produce a bit sequence pattern Sxxy yyyz zzzz zzzz, where S is a polarity sign bit, x is a bit that depends on U, y is a bit that depends on W and V, and z is an arbitrary bit. In this way, a PARCOR coefficient having a larger absolute value is quantized with a higher quantization precision.

MODIFICATION OF PRACTICAL EXAMPLE 2

Next, a modification of the practical example 2 will be described. This modification is a generalized example of the specific example 4 described above in which the processing of Step S4 in the practical example 2 is omitted.

According to this modification, the information on the polarity sign S(i) obtained in the processing of Step S1 is transmitted to the coefficient coding part 909 as a coding target.

Besides, the bit sequence pattern 0xxy yyyz zzzz zzzz is obtained as the bit sequence L'(i) in the processing of Step S3. Thus, the 16-bit sequence obtained in the processing of Step S3 is regarded as the quantized PARCOR coefficient K'O(i). In the example described above, the resulting bit sequences are as follows.

In the case where ab=11, that is, W=3, the resulting bit sequence K'O(i) is 011c def0 0000 0000.

In the case where ab=10, that is, W=2, the resulting bit sequence K'O(i) is 010c de00 0000 0000.

In the case where ab=01, that is, W=1, the resulting bit sequence K'O(i) is 001c d000 0000 0000.

In the case where ab=00, that is, W=0, the resulting bit sequence K'O(i) is 000c 0000 0000 0000.

PRACTICAL EXAMPLE 3

Figure 7:
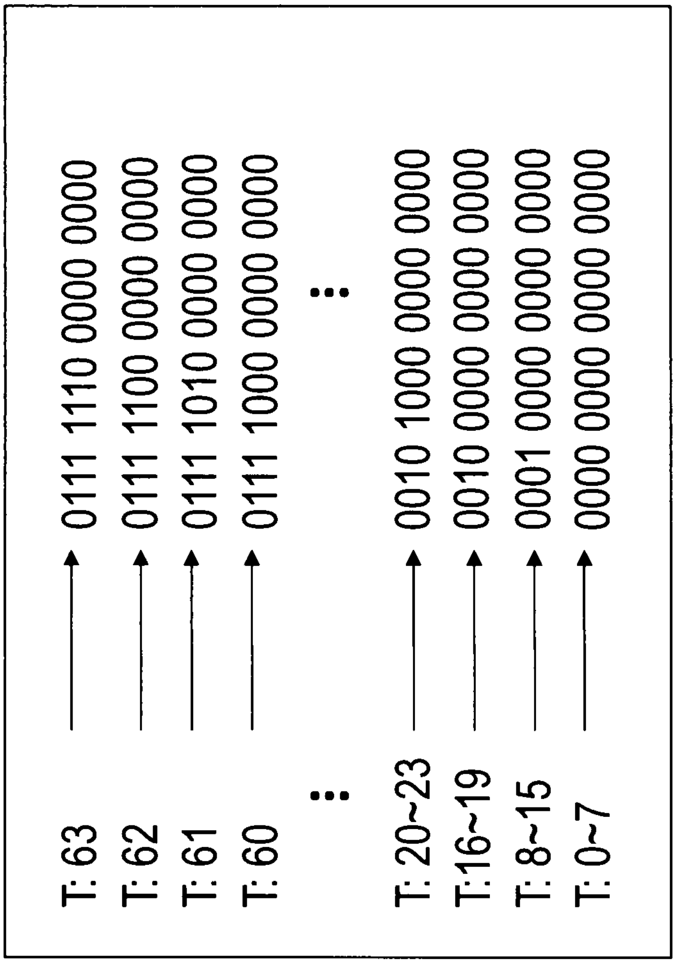
FIG. 7 shows an exemplary look-up table.
Figure 8:
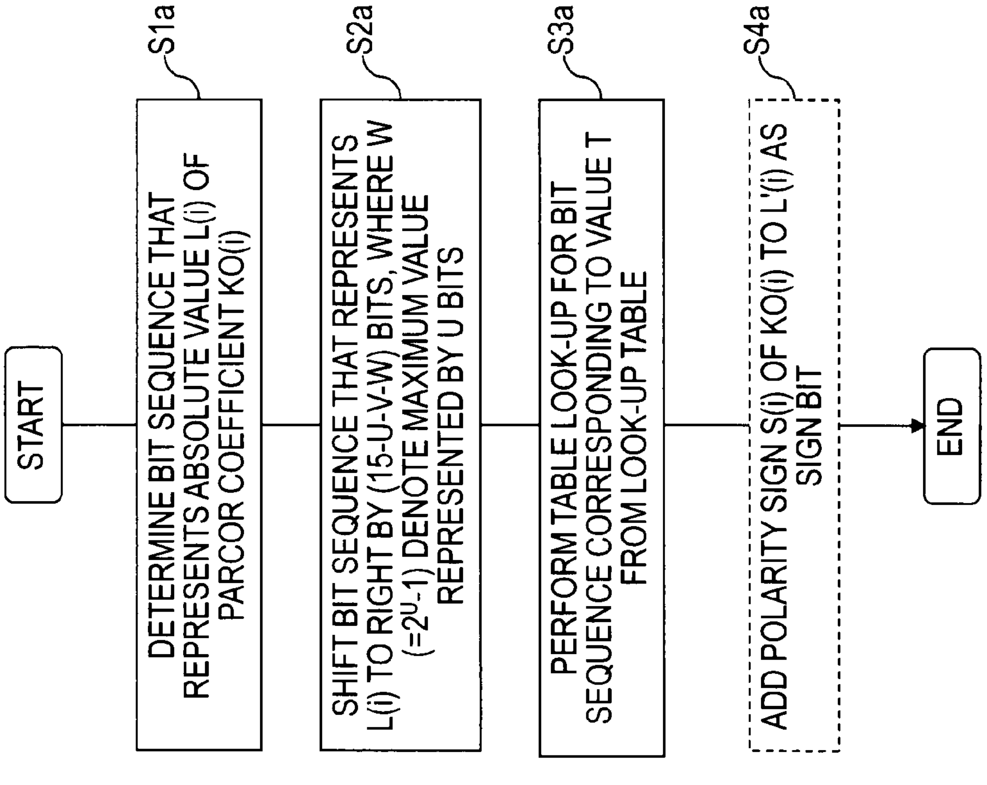
FIG. 8 is a diagram showing a process flow of the PARCOR coefficient quantization according to the practical example 3.
Figure 9:
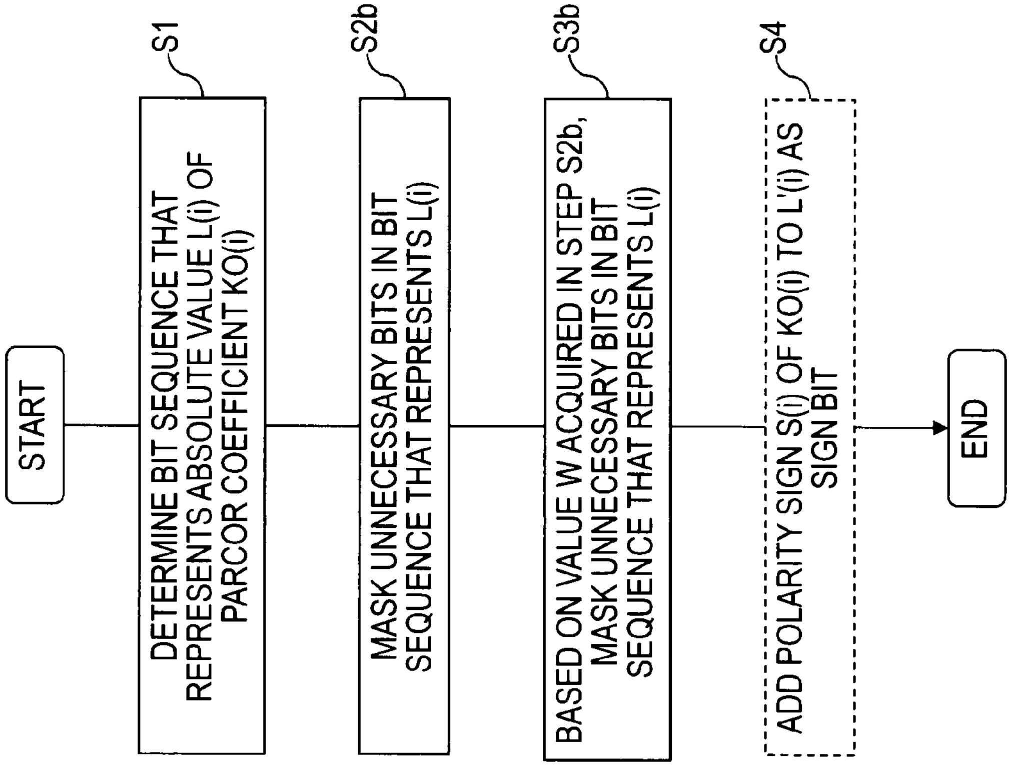
FIG. 9 is a diagram showing a flow of a PARCOR coefficient quantization process according to a practical example 4.

Next, a practical example 3 will be described. The practical example 3 differs from the practical example 2 that primarily uses shift calculation in that a look-up table stored in a memory 50 is used. FIG. 7 shows an exemplary look-up table. The number of effective bits from the most significant bit toward the least significant bit included in the bit sequence allocated by the look-up table increases with the value T. Note that the exemplary look-up table allocates bit sequences the most significant bit of which is 0 to the values T as an example corresponding to the processing that uses the absolute value of the PARCOR coefficient KO(i) represented by 16 bits with sign.

A quantization part 100*a* in the practical example 3 comprises a first processing part 102*a*, a second processing part 104*a*, a third processing part 106*a*, and an addition part 108*a*. In this example, it is assumed that the PARCOR coefficient is represented by an R-bit value, U represents a predetermined integer equal to or greater than 1 and smaller than $\{R-(2^U-1)\}$, and V represents a predetermined integer equal to or greater than 0 and smaller than $\{R-(2^U-1)-U\}$. The reason why U and V are defined as described above is because U and V have to satisfy a relationship R-U-V-W 0, because a bit shift calculation of (R-U-V-W) bits is performed as described later, where W satisfies a relationship $0 \le W \le 2^U-1$. However, for example, it may be assumed that U is a predetermined integer equal to or greater than 1 and smaller than R, and V is a predetermined integer equal to or greater than 0 and smaller than R. In this case, if $R-U-V-W<0$, the bits to the right missing in the bit shift calculation can be regarded as 0. The following is a more specific description in which it is assumed that R=16, U=2, and V=1.

First, the first processing part 102*a* determines a bit sequence that represents the absolute value L(i) of the PARCOR coefficient KO(i) (Step S1*a*). In this step, the first processing part 102*a* stores, in a memory, information on the polarity sign S(i) represented by a sign bit of the PARCOR coefficient KO(i). For example, in the case where the bit sequence of the PARCOR coefficient KO(i) is a 16-bit sequence Sabc defg hijk lmno (S is a sign bit, and each bit "a" to "o" assumes a value 0 or 1), the determined bit sequence that represents the absolute value L(i) is a 15-bit sequence without sign 0abc defg hijk lmno. The polarity sign S(i)=S is stored in the memory.

Then, on the assumption that the maximum value represented by U bits is W ($=2^U-1$), the second processing part 104*a* shifts the bit sequence representing the absolute value L(i) to the right by (15-U-V-W) bits (Step S2*a*). The resulting value is denoted as T (in the decimal notation). In the example described above, the bit sequence representing the absolute value L(i) is shifted to the right by 9 bits to produce a value "0abc def". The value T is the decimal notation of the value "0abc def" in the binary notation.

Then, using the value T, the third processing part 106*a* performs a table look-up for a bit sequence corresponding to the value T in the look-up table (Step S3*a*). The resulting bit sequence is denoted as L'(i). In the case where T=61, for example, the resulting bit sequence L'(i) is 0111 1010 0000 0000.

Then, the addition part 108*a* adds the polarity sign S(i) of the PARCOR coefficient KO(i) to the bit sequence L'(i) as a sign bit (Step S4*a*). In the example described above, the sign bit S(i)=S is added to the bit sequence L'(i) as the most significant bit (MSB). However, for example, in the processing of Step S3*a*, a polarity sign (or a sign that means the polarity) may be added to the value T to produce a value T', and the value T' may be used for table look-up for the bit sequence corresponding to the value T' in the look-up table to determine the bit sequence L'(i) with the polarity sign.

The 16-bit sequence obtained in the processing of Step S4*a* represents the quantized PARCOR coefficient K'O(i).

In this practical example, nonlinear quantization can also be performed to produce a bit sequence pattern Sxxy yyyz zzzz zzzz. Although the table look-up requires an extra memory space, the calculation amount can be reduced because the amount of shift calculation can be reduced. Although the PARCOR coefficient K'O(i) has been described as being represented by an R-bit value with sign, the practical example 3 can be applied to a PARCOR coefficient K'O(i) represented by an R-bit value without sign. Alternatively, as in the modification of the practical example 2, the processing of Step S4*a* may be omitted.

PRACTICAL EXAMPLE 4

Next, a practical example 4 will be described. The practical example 4 differs from the practical example 2 that uses shift calculation in that a bit-based AND operation (bit mask) is used. The following description will be focused on the differences from the practical example 2.

Following the processing of Step S1 in the practical example 2, the second processing part 104 masks unnecessary bits in the bit sequence representing the absolute value L(i) (a bit-based AND operation with 1 is performed for the necessary bits, and a bit-based AND operation with 0 is performed for the unnecessary bits) (Step S2*b*).

The resulting value is denoted by W (in the decimal notation). In the example described above, since U=2, a bit-based AND operation is performed for the 16-bit sequence 0abc defg hijk lmno that represents the absolute value of the PARCOR coefficient KO(i) and a bit sequence 0110 0000 0000 0000, the bits from the 15-th bit to the bit immediately preceding the (15−U)-th bit of which are 1 and the (15−U)-th bit and the following bits of which are 0, to produce a bit sequence 0ab0 0000 0000 0000. The value W is the decimal notation of the value "0ab" in the binary notation.

Then, based on the value W described above, the third processing part 106 masks unnecessary bits in the bit sequence that represents the absolute value L(i) (a bit-based AND operation with 1 is performed for the necessary bits, and a bit-based AND operation with 0 is performed for the unnecessary bits) (Step S3*b*). The result is denoted by L'(i). In the example described above, in the case where U=2, V=1, and W=3, a bit-based AND operation is performed for the 16-bit sequence 0abc defg hijk lmno that represents the absolute value of the PARCOR coefficient KO(i) and a bit sequence 0111 1110 0000 0000, the 15-th to (15−U−V−W−1)-th bits of which are 1 and the (15−U−V−W)-th bit and the following bits of which are 0, to produce a bit sequence 0abc def0 0000 0000.

Following the processing of Step S3*b*, the processing of Step S4 described in the practical example 2 is performed.

However, as in the modification of the practical example 2, the processing of Step S4 may be omitted.

<Modification 1>

The quantization method according to the present invention can be applied only to part of the PARCOR coefficients KO(i) in the PARCOR coefficient sequence KO=(KO(1), KO(2), . . . , KO(PO)) input to the quantization part 100, 100*a*. The remaining PARCOR coefficients KO(i), to which the quantization method according to the present invention is not applied, are quantized according to a conventional quantization method, for example.

Criterions for selecting the PARCOR coefficients KO(i) to which the quantization method according to the present invention is applied include the order PO and the value of the PARCOR coefficient, for example.

In the case where the order PO is used as a criterion, the quantization method according to the present invention is applied to the PARCOR coefficients of the orders equal to or lower than a predetermined order or lower than the order, of the input PARCOR coefficients K(1), K(2), . . . , K'(P) of the first order to the P-th order. The reason why the quantization method according to the present invention is applied to the PARCOR coefficients of the orders equal to or lower than a predetermined order (the third order, for example) or lower than the order is that a PARCOR coefficient of a lower order generally assumes a larger value as shown in FIG. 4 of Non-patent literature 4.

In the case where the value of the PARCOR coefficient is used as a criterion, the quantization method according to the present invention is applied to the PARCOR coefficients equal to or greater than a predetermined threshold or greater than the threshold. This is because the increase of the code amount of the residual code CeO due to the quantization error of the PARCOR coefficient increases with the value of the PARCOR coefficient.

<Modification 2>

According to a conventional lossless audio signal coding method (see Non-patent literature 4), a function quantitatively determined from observation of an experimental result is used, rather than a theoretically determined function. Accordingly, if the number of samples in one frame is as small as ten times the number of PARCOR coefficients (about 100 samples in one frame in the case of 10 PARCOR coefficients), for example, the code amount of the coefficient code CkO is not significantly smaller than the code amount of the residual code CeO. Therefore, the code amount required for the PARCOR coefficients is not negligible, and the code amount of the synthesis code CaO is not always minimized.

Thus, in the case where the number of samples of input signals used for calculation of the PARCOR coefficient sequence is equal to or smaller than a predetermined threshold or smaller than the threshold, the quantization method according to the present invention can be applied to part or all of the PARCOR coefficients in the PARCOR coefficient sequence KO=(KO(1), KO(2), . . . , KO(PO)).

As described above, the synthesis code CaO is a combination of the residual code CeO and the coefficient code CkO. In the case where the residual code CeO is large enough that the coefficient code CkO is negligible, an error of the coefficient code CkO does not lead to a significant error of the code amount of the coefficient code CkO. Otherwise, however, a significant error occurs. Whether the code amount of the coefficient code CkO is negligible or not can be determined for the number of samples N in one frame according to the formula (12). If N is small, the code amount of the coefficient code CkO is negligible. If N is large, the code amount is not negligible. For example, the quantization method according to the present invention can be applied to the PARCOR coefficients if N=40 to 80, and the conventional quantization method can be applied to the PARCOR coefficients if N=160 to 320 (these specific numbers of samples depend on the sampling rate of the input signals, and the sampling rate is 8 kHz in these specific examples). Even in the case where the one frame of input signals contains 160 samples, if the frame is further divided into four sub-frames in such a manner that each sub-frame contains 40 samples, the number of samples per frame can be regarded as 40, and the quantization method according to the present invention can be applied to the PARCOR coefficients.

The present invention is not limited to the embodiment described above and can be appropriately modified without departing from the spirit of the present invention.

For example, the number R of bits that represents the PARCOR coefficient K'O(i) is not limited to 16 but may be 32 or 8. Although the shift calculation to determine the absolute value of the PARCOR coefficient K'O(i) has been described by taking 15 bits right-aligned as an example, the shift calculation may be performed in a left-aligned manner. Although bits located to the left in the bit sequence represent larger values in the above description, bits located to the right in the bit sequence may represent larger values (horizontal reverse). 8 bits (1 byte) may be rearranged depending on the endian (big/little-endian). Although bits located to the right are padded with 0 in the above description, those bits may be padded with 1 or any other value. Furthermore, the absolute value may not be determined, and the table look-up may be performed using the PARCOR coefficients themselves.

The quantization method according to the present invention can be performed by a computer by loading, into a recording part of the computer, a program that makes the computer operate as each of the functional parts according to the present invention, such as the processing part, the input part and the output part. The program can be loaded into the computer by recording the program in a computer-readable recording medium and then loading the program from the recording medium into the computer, or by recording the program in a server or the like and then loading the program into the computer via an electric communication line or the like.

What is claimed is:

1. A method for quantizing a partial autocorrelation (PARCOR) coefficient, comprising:

quantizing, by a processor, a PARCOR coefficient K, wherein the quantizing is a step of quantizing a PARCOR coefficient having a larger absolute value with a higher quantization precision, the quantizing of the PARCOR coefficient K further comprises:

determining, by the processor, a bit sequence that represents an absolute value L of the PARCOR coefficient K; and obtaining, by the processor, a quantized PARCOR coefficient from a look-up table corresponding to U+V+W bits beginning with a most significant bit in the bit sequence that represents the absolute value L of the PARCOR coefficient K, wherein a value of U bits beginning with the most significant bit in the bit sequence that represents the absolute value L being denoted as W, the PARCOR coefficient K being represented as a value of R bits, the U representing a predetermined integer which is equal to or greater than 1 and smaller than $R-(2^U-1)$, and the V representing a predetermined integer equal to or greater than 0 and smaller than $R-(2^U-1)-U$.

2. A non-transitory computer readable medium having a computer program recorded thereon, the computer program configured to perform a method for quantizing a partial autocorrelation (PARCOR) coefficient when executed on a computer, the method comprising:

quantizing a PARCOR coefficient K;

determining a bit sequence that represents an absolute value L of the PARCOR coefficient K; and obtaining a quantized PARCOR coefficient from a look-up table corresponding to U+V+W bits beginning with a most significant bit in the bit sequence that represents the absolute value L of the PARCOR coefficient K, wherein a value of U bits beginning with the most significant bit in the bit sequence that represents the absolute value L being denoted as W, the PARCOR coefficient K being represented as a value of R bits, the U representing a predetermined integer which is equal to or greater than 1 and smaller than $R-(2^U-1)$, and the V representing a predetermined integer equal to or greater than 0 and smaller than $R-(2^U-1)-U$.

3. A device for quantizing a partial autocorrelation (PARCOR) coefficient, comprising:

a processor configured to:

quantize a PARCOR coefficient K;

determine a bit sequence that represents an absolute value L of the PARCOR coefficient K; and obtain a quantized PARCOR coefficient from a look-up table corresponding to U+V+W bits beginning with a most significant bit in the bit sequence that represents the absolute value L of the PARCOR coefficient K, wherein a value of U bits beginning with the most significant bit in the bit sequence that represents the absolute value L being denoted as W, the PARCOR coefficient K being represented as a value of R bits, the U representing a predetermined integer which is equal to or greater than 1 and smaller than $R-(2^U-1)$, and the V representing a predetermined integer equal to or greater than 0 and smaller than $R-(2^U-1)-U$.

* * * * *